(12) United States Patent
Kang et al.

(10) Patent No.: US 10,158,792 B2
(45) Date of Patent: Dec. 18, 2018

(54) METHOD FOR DISPLAYING IMAGE, IMAGE PICKUP SYSTEM AND ENDOSCOPE APPARATUS INCLUDING THE SAME

(71) Applicant: INTHESMART Inc., Seoul (KR)

(72) Inventors: Uk Kang, Seoul (KR); Ilhyung Shin, Jeju (KR)

(73) Assignee: INTHESMART Inc., Seoul (KR)

(*) Notice: Subject to any disclaimer, the term of this patent is extended or adjusted under 35 U.S.C. 154(b) by 135 days.

(21) Appl. No.: 15/153,042

(22) Filed: May 12, 2016

(65) Prior Publication Data
US 2017/0187930 A1 Jun. 29, 2017

(51) Int. Cl.
| H04N 5/225 | (2006.01) |
| G06F 3/147 | (2006.01) |
| H04N 5/232 | (2006.01) |
| H04N 5/374 | (2011.01) |

(52) U.S. Cl.
CPC .......... *H04N 5/225* (2013.01); *G06F 3/147* (2013.01); *H04N 5/232* (2013.01); *H04N 5/23245* (2013.01); *H04N 5/23258* (2013.01); *H04N 5/374* (2013.01); *H04N 2005/2255* (2013.01)

(58) Field of Classification Search
None
See application file for complete search history.

(56) References Cited

U.S. PATENT DOCUMENTS

| 2008/0068359 A1* | 3/2008 | Yoshida | G09G 3/3406 345/204 |
| 2011/0032347 A1* | 2/2011 | Lacey | A61B 1/00154 348/68 |
| 2014/0043502 A1* | 2/2014 | Ioka | H04N 5/2357 348/226.1 |

FOREIGN PATENT DOCUMENTS

| JP | 2010-063589 A | 3/2010 |
| JP | 2013-046672 A | 6/2013 |
| JP | 5221722 B2 | 6/2013 |
| JP | 2014-050514 A | 3/2014 |

\* cited by examiner

*Primary Examiner* — Eileen M Adams
(74) *Attorney, Agent, or Firm* — Patent Office of Dr. Chung Park

(57) ABSTRACT

Provided is an image display system including: a motion detector which is mounted in an apparatus and which senses a movement of the apparatus; an image sensor which performs an image pickup of an object, and converts the image into an image signal; an image sensor controller which receives a movement signal from the motion detector and controls activation of the image sensor according to amount of the movement of the apparatus; an image signal processor which performs image processing for the image signal and generates an image; and a display unit which displays the image.

16 Claims, 10 Drawing Sheets

| 0 1 | 1 1 | 1 1 |
|-----|-----|-----|
| 0 1 | 0 0 | 1 0 |
| 0 1 | 0 0 | 1 0 |

VS

(B)

| 0 1 | 1 0 | 1 1 |
|-----|-----|-----|
| 0 1 | 1 1 | 1 0 |
| 0 1 | 0 0 | 1 0 |

A xor B, (Sum : N)

| 0 0 | 0① | 0 0 |
|-----|-----|-----|
| 0 0 | ①① | 0 0 |
| 0 0 | 0 0 | 0 0 |

METHOD FOR DISPLAYING IMAGE, IMAGE PICKUP SYSTEM AND ENDOSCOPE APPARATUS INCLUDING THE SAME

CROSS-REFERENCE TO RELATED APPLICATIONS

This application claims priority under 35 U.S.C. § 119 from Korean Application No. 10-2015-0188074 filed on Dec. 29, 2015, the subject matter of which is incorporated herein by reference.

BACKGROUND OF THE INVENTION

Field of the Invention

The present disclosure relates to a digital image processing method of an image pickup apparatus which can display an image, an image display system, and an endoscope apparatus including the image display system.

Description of the Related Art

In general, not only a mobile phone and a digital camera but also an endoscope apparatus which is a medical device may be equipped with an image sensor such as a CMOS image sensor or a CCD image sensor so as to image a light emitted from a target object.

The image sensor may convert an optical signal into an electrical signal depending on the brightness and wavelength of light entering into each pixel in a photographing mode.

An input image signal obtained through the image sensor may be converted into an image signal such as RGB or the like through an image signal processing, for example, through an image signal processing by a digital signal processor, and the image signal may be displayed through a display device such as LCD.

The quality of the displayed image needs to be improved through various image processing according to a video or a still image.

SUMMARY OF THE INVENTION

The present disclosure has been made in view of the above problems, and provides an image display method, an image display system for processing image data differently according to a movement or a displayed image of an image display apparatus such as a mobile phone, a digital camera, and an endoscope apparatus, and a laparoscopic apparatus including the image display system.

In accordance with an aspect of the present disclosure, an image display system includes: a motion detector which is mounted in an apparatus and which senses a movement of the apparatus; an image sensor which performs an image pickup of an object, and converts the image into an image signal; an image sensor controller which receives a movement signal from the motion detector and controls activation of the image sensor according to amount of the movement of the apparatus; an image signal processor which performs image processing for the image signal and generates an image; and a display unit which displays the image.

The image sensor controller supplies a timing control signal for controlling the activation of the image sensor in time to the image sensor.

The image sensor controller supplies a first timing control signal to the image sensor, when the amount of the movement of the apparatus is equal to or more than a critical value, and supplies a second timing control signal which is delayed for the first timing control signal to the image sensor, when the amount of the movement of the apparatus is less than the critical value.

The image sensor controller supplies a first timing control signal to the image sensor, when the amount of the movement of the apparatus is equal to or more than a critical value, and supplies the first timing control signal and a second timing control signal which is delayed for the first timing control signal to the image sensor, when the amount of the movement of the apparatus is less than the critical value.

The second timing signal is supplied cyclically or randomly within a single image period.

The motion detector includes at least one of a gyro sensor and an acceleration sensor.

In accordance with another aspect of the present disclosure, an image display system includes: an image sensor which performs an image pickup of an object, and converts the image into an image signal; an image signal processor which performs image processing for the image signal and generates an image; an image sensor controller which controls activation of the image sensor according to amount of the movement of the image; and a display unit which displays the image.

The amount of the movement of the image is amount of changed image data between frames.

The amount of changed image data between frames is amount of changed image data between the image data in n frame and the image data in n+1 frame.

The image sensor controller supplies a timing control signal for controlling the activation of the image sensor in time to the image sensor.

The image sensor controller supplies a first timing control signal to the image sensor, when the amount of the movement of the image is equal to or more than a critical value, and supplies a second timing control signal which is delayed for the first timing control signal to the image sensor, when the amount of the movement of the image is less than the critical value.

The image sensor controller supplies a first timing control signal to the image sensor, when the amount of the movement of the image is equal to or more than a critical value, and supplies the first timing control signal and a second timing control signal which is delayed for the first timing control signal to the image sensor, when the amount of the movement of the image is less than the critical value.

The second timing signal is supplied cyclically or randomly within a single image period.

In accordance with another aspect of the present disclosure, an image display system includes: an image sensor which performs an image pickup of an object on a frame-by-frame basis to accumulate photo-charges; a frame comparator which compares a changed image data between an image data of n frame and an image data of n+1 frame; and an image sensor controller which controls the image sensor so as to adjust amount of photo-charges accumulated in the image sensor according to amount of the changed image data based on a critical value The image sensor controller controls the image sensor to accumulate a first photo-charges in the image sensor when the amount of the changed image data is equal to or more than the critical value, and to accumulate a second photo-charges more than the first photo-charges in the image sensor when the amount of the changed image data is less than the critical value.

In accordance with another aspect of the present disclosure, an image display method for displaying an image configured of a plurality of frames in a unit time includes: displaying an image configured of the number of a first frame when the image is a video, and displaying an image configured of the number of a second frame smaller than the number of the first frame when the image is a still image.

Luminance of the image configured of the number of the second frame is larger than luminance of the image configured of the number of the first frame.

In accordance with another aspect of the present disclosure, an image display method for displaying an image by performing an image signal processing for an input image through an image sensor, and performing an image processing for the image through an image signal processor, wherein control signals different in time are applied to the image sensor so that an image signal processing for the image is performed.

In accordance with another aspect of the present disclosure, an endoscope apparatus includes: an endoscope which is inserted into a body cavity; a motion detector which is mounted in the endoscope and which senses a movement of the endoscope; an image sensor which performs an image pickup of a target in the body cavity, and converts the image into an image signal; an image sensor controller which receives a movement signal from the motion detector and controls activation of the image sensor according to amount of the movement of the endoscope; an image signal processor which performs image processing for the image signal and generates an image; and a display unit which displays the image.

BRIEF DESCRIPTION OF THE DRAWINGS

The objects, features and advantages of the present disclosure will be more apparent from the following detailed description in conjunction with the accompanying drawings, in which.

DETAILED DESCRIPTION OF EXEMPLARY EMBODIMENTS

Exemplary embodiments of the present disclosure are described with reference to the accompanying drawings in detail. The same reference numbers are used throughout the drawings to refer to the same or like parts. Detailed descriptions of well-known functions and structures incorporated herein may be omitted to avoid obscuring the subject matter of the present disclosure.

Figure 1:
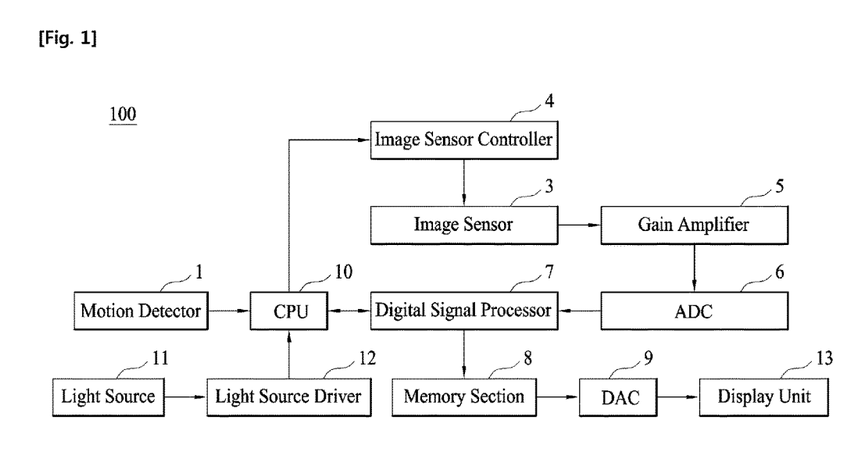
FIG. 1 is a diagram illustrating an image display system according to a first embodiment of the present disclosure.

FIG. 1 is a diagram illustrating an image display system according to a first embodiment of the present disclosure.

Referring to FIG. 1, the image display system 100 may include a motion detector 1, an image sensor 3, an image sensor controller 4, a gain amplifier 5, an analog-digital converter (ADC) 6, a digital signal processor (DSP) 7, a memory section 8, a digital-analog converter (DAC) 9, a central processing unit (CPU) 10, a light source 11, a light source driver 12, and a display unit 13.

The motion detector 1 may be mounted, although not shown in a drawing, on an apparatus provided with an image display system such as a digital camera, a mobile phone, a laparoscopic apparatus, and the like and detect a motion of the apparatus.

In addition, the motion detector 1 may use a gyro sensor for measuring the orientation change of an object or an acceleration sensor for measuring an acceleration of an object, but any means which is able to detect a movement may be available as well as the gyro sensor and the acceleration sensor.

The image sensor 3 may perform an image pickup of an object, and photoelectrically convert the image into an image signal. Both a charge coupled device (CCD) image sensor and a complementary metal oxide semiconductor (CMOS) image sensor may be available for the image sensor 3.

A component for generating an imagery by performing a post image processing for an image signal in the image sensor 3 may include various components. For the convenience of explanation, an entire configuration of those components may be referred to as an image signal processor.

The CPU 10 may control an entire component such as the digital signal processor 7, and, in particular, may receive a motion signal of the apparatus from the motion detector 1 and apply a control signal to the image sensor controller 4 so as to control activation of the image sensor 3.

The image sensor controller 4 may receive the control signal from the CPU 10, and control the image sensor 3 so that the image sensor 3 may operate.

The image sensor 3 may be controlled in various methods based on the motion signal from the image sensor controller 4. For example, without a control by the control signal of the CPU 10, the image sensor controller 4 may operate by directly receiving the control signal from the motion detector 1 and, through this, the image sensor may be controlled.

In this case, the image sensor controller 4 may perform a function of the CPU.

The gain amplifier 5 may perform a gain control for the image signal generated by the image sensor 3, and the analog-digital converter 6 may convert the image signal into a digital signal.

The digital signal processor 7 may perform various types of image processing such as image synthesis and white balancing for a digital image signal.

In addition, the digital signal processor 7 may adjust a timing of image processing under the interaction with the CPU.

The light source 11 may use a lamp and preferably use an LED, and emit a light of an image of an image pickup range during an image pickup operation by the image sensor 3.

The light source driver 12 may drive the light source 11, and control the emission of light from the light source 11. For example, the light source driver 12 may control the intensity of light emitted from the light source 11 depending on whether the image processed by the digital signal processor 7 is a still image or a video.

The memory section 8 may store image data output from the digital signal processor 7 on a frame-by-frame basis or on an image-by-image basis.

The digital-analog converter 9 may perform a process for displaying the image data, for example, an analog process, and output the image data to the display unit 13.

The display unit 13 may display a video or a still image and information on an observation target image such as an observation target image including information on a observation target location, a parameter, and the like to a display monitor such as LCD.

Figure 2:
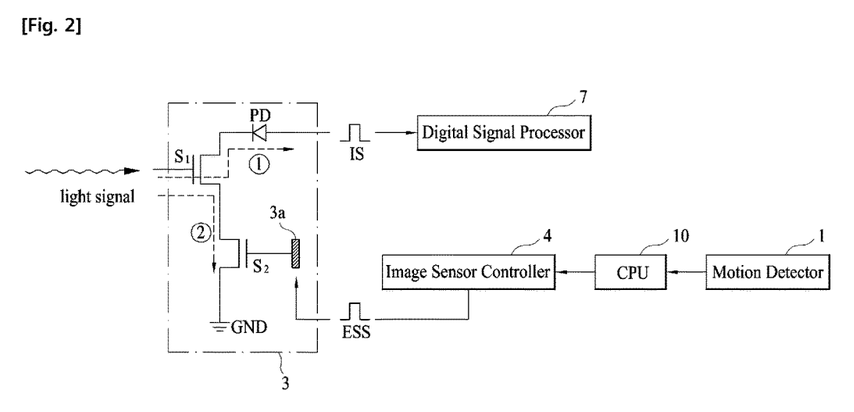
FIG. 2 is a diagram illustrating a method for controlling an image sensor in the image display system according to a first embodiment of the present disclosure.
Figure 3A:
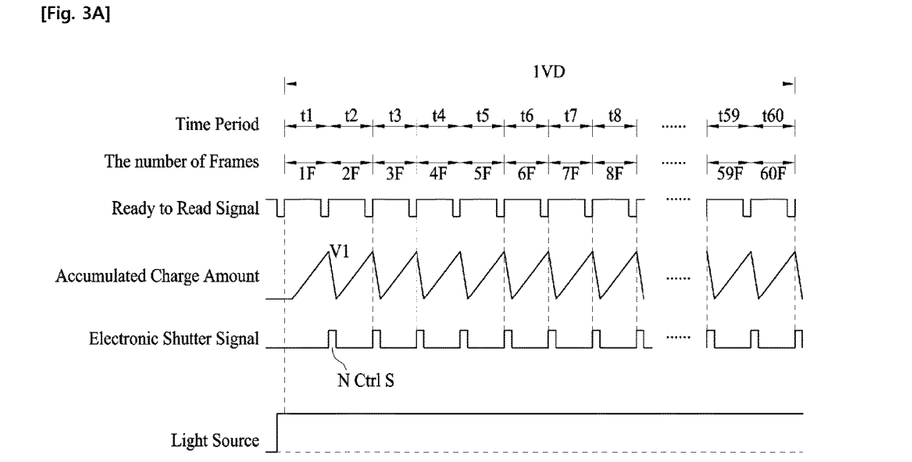
FIG. 3A and FIG. 3B are a timing chart illustrating an image pickup operation performed by the image display system according to a first embodiment of the present disclosure.
Figure 3B:
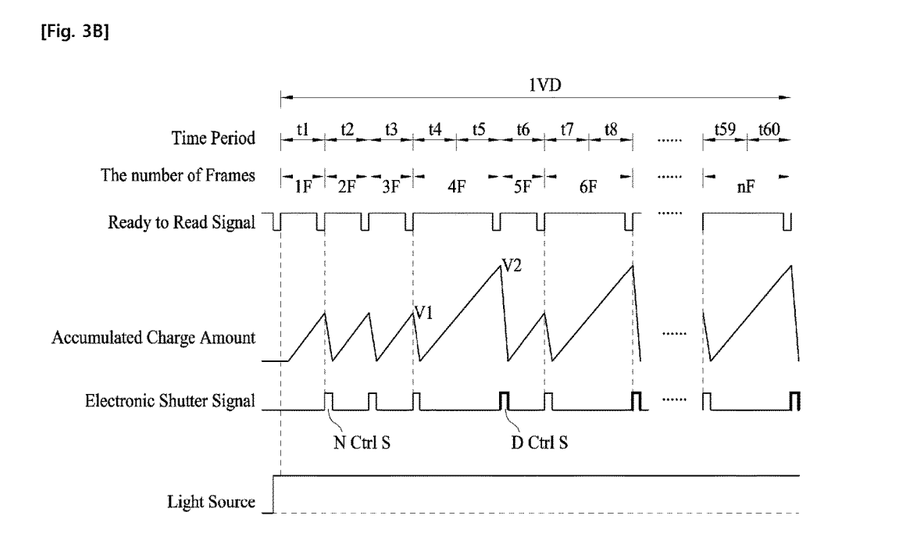

FIG. 2 is a diagram illustrating a method for controlling an image sensor in the image display system according to a first embodiment of the present disclosure, and FIG. 3A and FIG. 3B are a timing chart illustrating an image pickup operation performed by the image display system according to a first embodiment of the present disclosure.

Referring to FIG. 2, FIG. 3A and FIG. 3B, the image sensor 3 may convert the image of the observation target into an image signal through the operation of a first switch S1 and a second switch S2.

In detail, when a ready to read signal (RTR Signal) is applied to perform an image pickup of the observation target, the first switch S1 may be turned on, and the second switch S2 may be turned off simultaneously so that charges are accumulated in a photodiode (PD) for a certain time (path ①).

Then, after a certain time is elapsed, when an electronic shutter signal (ESS) is inputted to an electronic shutter 3a for controlling the second switch S2, the second switch S2 which is grounded to a GND terminal may be turned on so that the charges accumulated in the photodiode (PD) may be reset again (path ②).

In this way, the image sensor 3 may perform a conversion into an image signal by repeating the operation on a frame-by-frame basis, and the converted image signal (IS) may be image processed through the digital signal processor 7.

The emission of light irradiated from the light source during the operation of the image sensor 3 may be maintained uniformly. Alternatively, the light source may vary the emission of light depending on the motion of the image.

For example, the light source may emit large amount of light when the image is a still image compared to a video. Accordingly, the luminance of the displayed image becomes high when the image is a still image in comparison with a video.

Meanwhile, the image sensor controller 4 may apply a timing control signal which is an electronic shutter signal (ESS) to the electronic shutter 3a of the image sensor 3 under the control of the CPU 10 based on the motion signal of the apparatus measured from the motion detector 1.

At this time, the timing control signal may be divided into a normal control signal (N Ctrl S) or a delay control signal (D Ctrl S) according to a motion signal value and the motion signal value may be determined by comparing an amount of motion of the apparatus measured by the motion detector 1 with a reference threshold.

For example, when the amount of motion of the apparatus is greater than or equal to the threshold value, the motion signal value corresponds to the normal control signal (N Ctrl S), whereas, when the amount of motion of the apparatus is less than the threshold value, the motion signal value corresponds to the delay control signal (D Ctrl S).

The timing control signal may be applied to the electronic shutter 3a of the image sensor 3 on a frame-by-frame basis in a single image (1VD) configured of a plurality of frames.

At this time, when the amount of motion of the apparatus is greater than or equal to the threshold value, as shown in FIG. 3A, the normal control signal (N Ctrl S) may be applied to the electronic shutter of the image sensor at the same time interval (t1=t2=t3= . . . =t60).

Accordingly, the time interval of every frame is identical, and the accumulated charge amount (V1) in the photodiode (PD) is identical in every frame.

When the amount of motion of the apparatus is less than the threshold value, as shown in FIG. 3B, the delay control signal (D Ctrl S) may be applied to the electronic shutter 3a of the image sensor with a time delay with respect to the normal control signal (N Ctrl S). Accordingly, the time interval of every frame is not identical, but it is changed according to an application time of the delay control signal (Ctrl S D).

When the delay control signal (D Ctrl S) is applied, the accumulated charge amount (V2) in the photodiode (PD) is larger than the charge amount (V1) which is accumulated in the photodiode (PD) when the normal control signal (N Ctrl S) is applied. Thus, the luminance of the displayed image is increased.

As described above, assuming that a single image (1VD) is configured of 60 frames per second when displaying an image, as in the present disclosure, when the amount of motion of the apparatus is greater than or equal to the threshold value, a single image (1VD) is configured of 60 frames per second and is displayed, like a general image display method. When the amount of motion of the apparatus is less than the threshold value, a single image (1VD) is configured of frames smaller(less) than 60 frames per second and is displayed, unlike a general image display method.

Next, various methods of displaying a single image configured of frames smaller(less) than 60 frames per second are described.

FIG. 4A to FIG. 4D are a diagram illustrating an application timing of a control signal according to a first embodiment of the present disclosure.

Figure 4A:
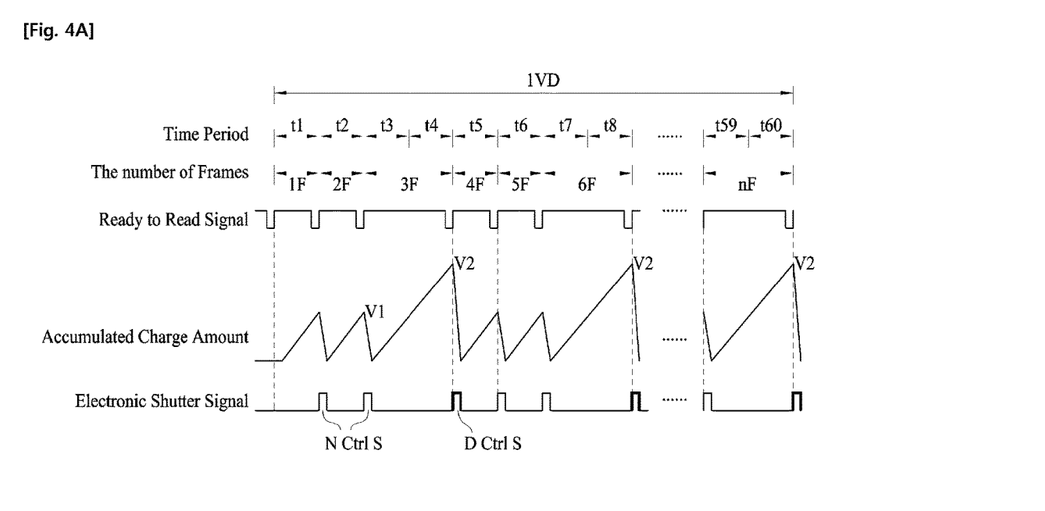
FIG. 4A to FIG. 4D are a diagram illustrating an application timing of a control signal according to a first embodiment of the present disclosure.

FIG. 4A shows the case in which the normal control signal (N Ctrl S) and the delay control signal (D Ctrl S) are applied during a single image period (1VD), and, in this case, the delay control signal (D Ctrl S) is applied with a certain cycle.

The accumulated charge amount in the photodiode (PD) may be changed depending on whether the applied signal is the normal control signal (N Ctrl S) or the delay control signal (D Ctrl S), and the number of frames constituting a single image may be represented as a sum of the numbers of the normal control signal (N Ctrl S) and the delay control signal (D Ctrl S).

Figure 4B:
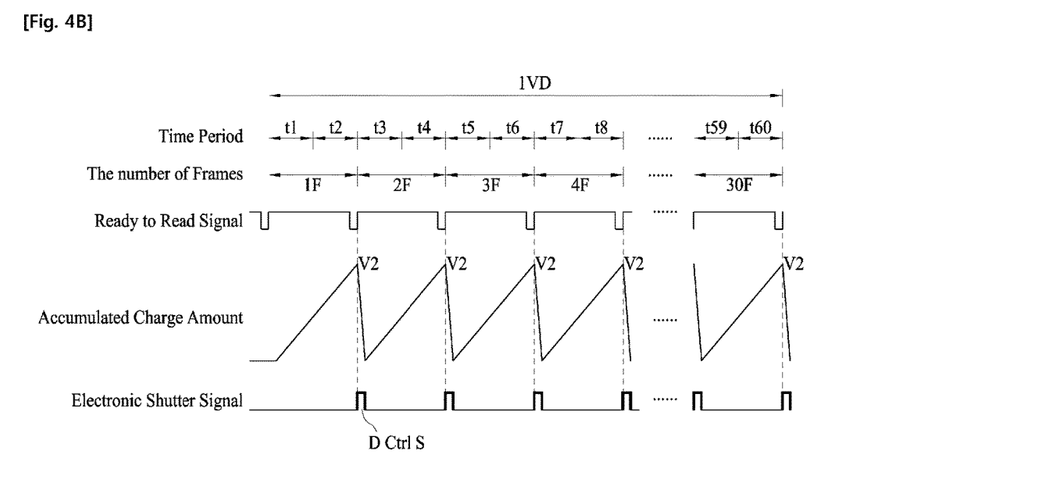

FIG. 4B shows the case in which only the delay control signal (D Ctrl S) is applied during a single image period (1VD), and, in this case, the delay control signal (D Ctrl S) is applied with a certain cycle.

The accumulated charge amount in the photodiode (PD) is larger than the charge amount when the normal control signal (N Ctrl S) is applied, and the number of frames constituting a single image may be represented as the number of the delay control signal (D Ctrl S).

Figure 4C:
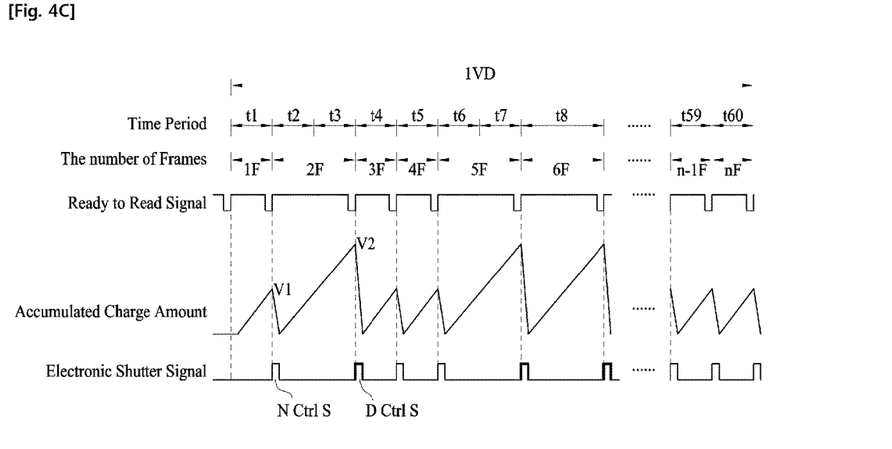

FIG. 4C shows the case in which the normal control signal (N Ctrl S) and the delay control signal (D Ctrl S) are applied during a single image period (1VD), and, in this case, the delay control signal (D Ctrl S) is applied randomly without a certain cycle.

The accumulated charge amount in the photodiode (PD), as shown in FIG. 4A, may be changed depending on whether the applied signal is the normal control signal (N Ctrl S) or the delay control signal (D Ctrl S), and the number of frames constituting a single image may be represented as a sum of the numbers of the normal control signal (N Ctrl S) and the delay control signal (D Ctrl S).

Figure 4D:
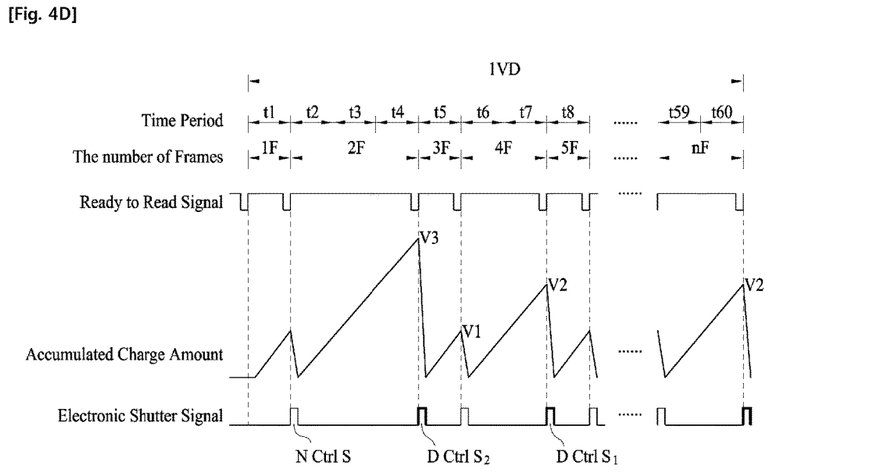

FIG. 4D shows the case in which the normal control signal (N Ctrl S) and the delay control signal (D Ctrl S) are applied during a single image period (1VD), and, in this case, the delay control signal (D Ctrl S) is a first delay control signal (D Ctrl S1) and a second delay control signal (D Ctrl S2) which is delayed for the first delay control signal (D Ctrl S1).

The delay control signals (D Ctrl S) may be applied with a certain period or may be applied randomly as shown in FIG. 4C.

In addition, the accumulated charge amount in the photodiode (PD), as shown in FIG. 4A, may be changed depending on whether the applied signal is the normal control signal (N Ctrl S) or the delay control signal (D Ctrl S), and the charge amount (V3) when the second delay control signal (D Ctrl S2) is applied is larger than the charge amount (V2) when the first delay control signal (D Ctrl S1) is applied.

The number of frames constituting a single image may be represented as a sum of the numbers of the normal control signal (N Ctrl S) and the delay control signal (D Ctrl S).

As described above, the control signal application method is described with reference to FIG. 4A to FIG. 4D, but it is not limited thereto, and the control signal application method according to the combination of the normal control signal (N Ctrl S) and the delay control signal (D Ctrl S) may be implemented variously depending on an image processing environment.

Figure 5:
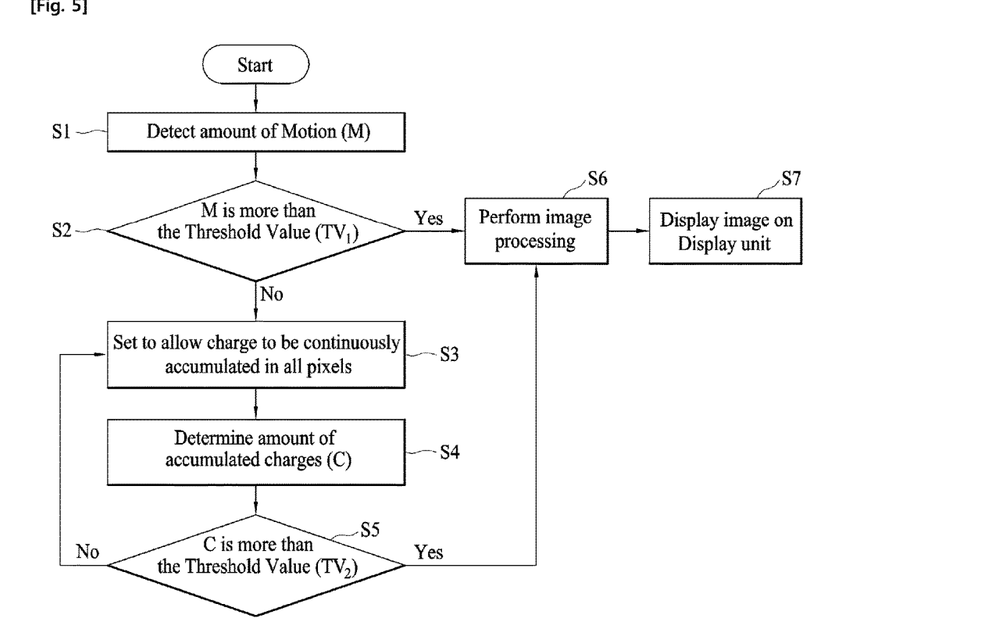
FIG. 5 is a flowchart illustrating an image display method of the image display system according to a first embodiment of the present disclosure.

FIG. 5 is a flowchart illustrating an image display method of the image display system according to a first embodiment of the present disclosure.

As shown, first, the amount of motion of the apparatus is detected through a motion detector (not shown) (Step 1).

Then, it is determined whether the amount of motion (M) is equal to or greater than a set threshold value (TV1) or is less than the threshold value (TV1) (Step 2).

When the amount of motion is equal to or greater than the threshold value (TV1), for example, when the image shown to user's eye is a video, an image processing is performed for the input image signal (Step 6).

Then, the processed image may be displayed on a display unit such as LCD (Step 7).

When the amount of motion (M) is less than the threshold value (TV1), for example, when the image shown to user's eye is a still image, the image processing is not immediately performed for the input image signal, but it is held when photo-charges are accumulated continuously for a period of time in all pixels (e.g., photodiode of image sensor) configuring a screen.

In terms of hardware, the photo-charges are accumulated through a control signal for operating the image sensor (Step 3).

Then, the amount of accumulated photo-charge (C) in the pixel is determined through a hardware component or a software (Step 4).

Then, it is determined whether the amount of photo-charge (C) is equal to or greater than a set threshold value (TV2) or is less than the threshold value (TV2) (Step 5).

At this time, when the amount of photo-charge is less than the threshold value (TV2), a control signal is adjusted so that photo-charges may be accumulated to be equal to or more than the threshold value in a pixel, and, when the amount of photo-charge is equal to or greater than the threshold value (TV2), an image processing is performed for the input image signal.

As described above, the image display method according to a first embodiment of the present disclosure may display image by adjusting an image processing timing according to the accumulated charge amount in the pixel on the basis of the amount of motion of the apparatus, however, alternatively, may display image according to an image processing timing signal on the basis of a preset time per one frame, without determining the accumulated charge amount in the pixels.

Figure 6:
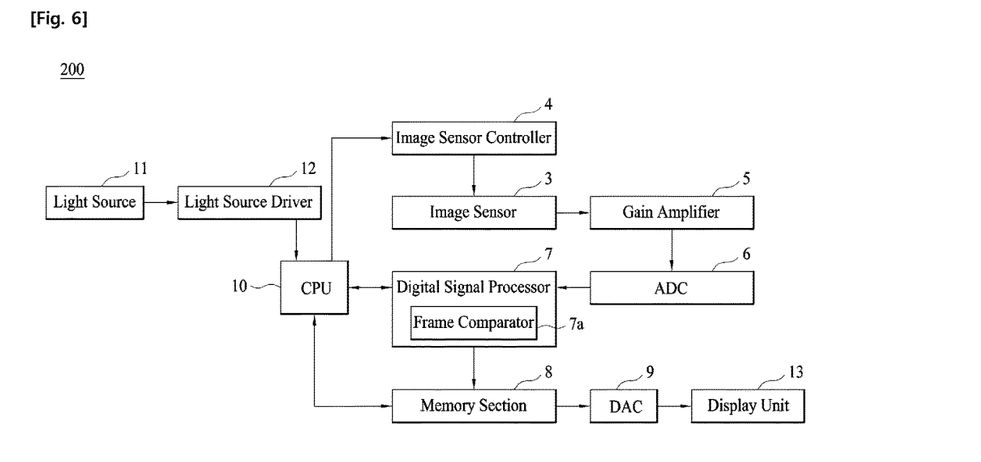
FIG. 6 is a diagram illustrating an image display system according to a second embodiment of the present disclosure.

FIG. 6 is a diagram illustrating an image display system according to a second embodiment of the present disclosure.

As shown, in the image display system 200 according to a second embodiment of the present disclosure, constituent elements similar to those shown in FIG. 1 are denoted by the same reference number, and a description thereof is omitted.

The image display system 200 may include the image sensor 3, the image sensor controller 4, the gain amplifier 5, the analog-digital converter (ADC) 6, the digital signal processor (DSP) 7, the memory section 8, the digital-analog converter (DAC) 9, the central processing unit (CPU) 10, the light source 11, the light source driver 12, and the display unit 13.

The digital signal processor 7 may perform an image processing for a digital image signal and a frame comparator 7a in the digital signal processor 7 may compare image data on a frame-by-frame basis.

The comparison of the image data may be performed by various methods, for example, performed by an XOR logic circuit.

The CPU 10 may control an entire component such as the digital signal processor 7, and, in particular, may receive a comparison signal of image data stored on a frame-by-frame basis and apply a control signal to the image sensor controller 4 so as to control activation of the image sensor 3.

Figure 7:
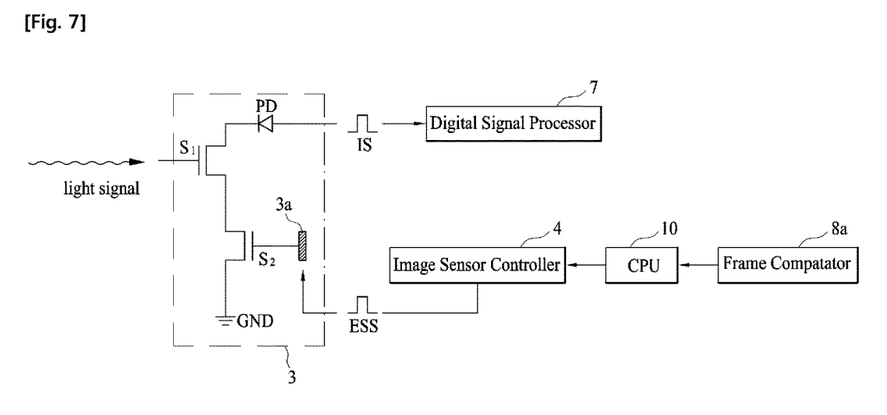
FIG. 7 is a diagram illustrating a method for controlling an image sensor in the image display system according to a second embodiment of the present disclosure.

FIG. 7 is a diagram illustrating a method for controlling an image sensor in the image display system according to a second embodiment of the present disclosure.

First, since the image sensor control method is identical with the description previously illustrated in FIG. 2, FIG. 3A, and FIG. 3B, an explanation thereof is omitted.

However, the image sensor controller 4 may apply a control signal which is an electronic shutter signal (ESS) to the electronic shutter 3a of the image sensor 3 under the control of the CPU 10 on the basis of the variation amount of the image measured from a frame comparator 8a.

At this time, the control signal may be divided into a normal control signal (N Ctrl S) or a delay control signal (D Ctrl S), and the variation amount of the image may be determined by comparing with a criteria value.

For example, when the variation amount of the image is equal to or greater than the criteria value, the control signal may correspond to the normal control signal (N Ctrl S), and, when the variation amount of the image is smaller than the criteria value, the control signal may correspond to the delay control signal (D Ctrl S).

The control signal may be applied to the electronic shutter 3a of the image sensor on a frame-by-frame basis in a single image (1VD) configured of a plurality of frames.

At this time, when the variation amount of the image is equal to or greater than the criteria value (CV), as shown in FIG. 3A, the normal control signal (N Ctrl S) may be applied to the electronic shutter of the image sensor at the same time interval (t1=t2=t3= . . . =t60).

Accordingly, the time interval of every frame is identical, and the accumulated charge amount (V1) in the photodiode (PD) is identical in every frame.

When the variation amount of the image is less than the criteria value, as shown in FIG. 3B, the delay control signal (D Ctrl S) may be applied to the electronic shutter 3a of the image sensor with a time delay with respect to the normal control signal (N Ctrl S).

Accordingly, the time interval of every frame is not identical, but it is changed according to an application time of the delay control signal (Ctrl S D).

In addition, when the delay control signal (D Ctrl S) is applied, the accumulated charge amount (V2) in the photodiode (PD) is larger than the charge amount (V1) which is accumulated in the photodiode (PD) when the normal control signal (N Ctrl S) is applied. Thus, the luminance of the displayed image is increased.

As described above, assuming that a single image (1VD) is configured of 60 frames per second when displaying an image, as in the present disclosure, when the variation amount of the image is greater than or equal to the criteria value, a single image is configured of 60 frames per second and is displayed, like a general image display method. In addition, when the variation amount of the image is less than the criteria value, a single image is configured of frames smaller(less) than 60 frames per second and is displayed, unlike the general image display method.

Further, when the delay control signal (D Ctrl S) is applied according to the variation amount of the image, since the method of displaying a single image configured of frames smaller(less) than 60 frames per second is identical with the description of FIG. 4A to FIG. 4D, an explanation thereof is omitted.

Figure 8:
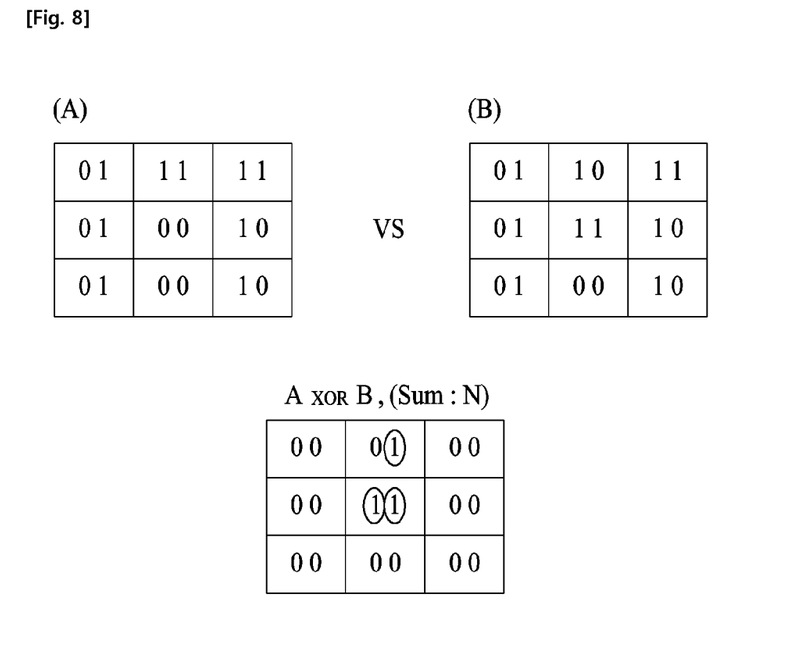
FIG. 8 is a diagram illustrating an operation of a frame comparator of the image display system according to a second embodiment of the present disclosure.

FIG. 8 is a diagram illustrating an operation of a frame comparator of the image display system according to a second embodiment of the present disclosure.

Referring to FIG. 8, the frame comparator (not shown) may compare the image data output from a digital signal processor through a logic comparison operation on a frame-by-frame basis. For example, when displaying a single image by the image data of two bits, the image data in n frame may be represented as A, and the image data in n+1 frame may be represented as B.

The image data of A and B may be determined whether the image data of A and the image data of B are identical with each other through a XOR logical operation. At this time, when the image data of A and the image data of B are identical with each other, there exists no valid value, and when the image data of A and the image data of B are not identical with each other, there exists a valid value.

Then, the total number of effective values may be obtained (Sum: N), and the total number N may be compared with a criteria value (CV) used as a reference value. The total number N is a value corresponding to the above described variation amount of the image.

The total number (N) may apply a comparison signal corresponding to the normal control signal or the delay control signal to the CPU (not shown) according to comparison with the criteria value.

In an embodiment of the present disclosure, the image data comparison between frames is accomplished by comparing the image data of current frame with the image data of previous frame, but may compare the image data of N frame with the image data of M-frame, where N frame and M frame may be, for example, a first frame and a second frame which are adjacent to each other in temporal order, or may be a first frame and a third frame which have a time delay.

In addition, the data comparison between frames may be accomplished by comparing the image data of a first group frame configured of a plurality of frames with the image data of a second group frame configured of a plurality of frames In an embodiment of the present disclosure, the image data comparison between frames is performed by using a XOR logical operation method, but it is not limited thereto and any operation method which can compare the image data is available.

Figure 9:
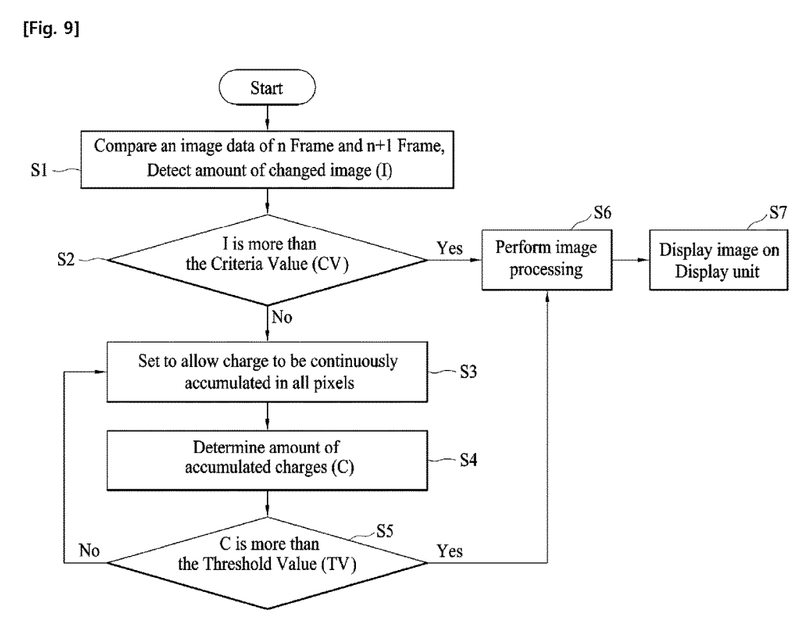
FIG. 9 is a flowchart illustrating an image display method of the image display system according to a second embodiment of the present disclosure.

FIG. 9 is a flowchart illustrating an image display method of the image display system according to a second embodiment of the present disclosure.

As shown, first, the frame comparator (not shown) compares the image data of n frame and the image data of n+1 frame, and detects amount of changed image (I) (Step 1). At this time, the image data comparison may be performed through various methods such as the above described XOR logical operation method.

Then, it is determined whether the amount of changed image (I) obtained in accordance with the image data comparison is equal to or greater than a set criteria value (CV) or is less than the criteria value (CV) (Step 2).

When the amount of changed image (I) is equal to or greater than the criteria value (CV), for example, when the image shown to user's eye is a video, an image processing is performed for the input image signal (Step 6).

Then, the processed image may be displayed on a display unit such as LCD (Step 7).

When the amount of changed image (I) is less than the criteria value (CV), for example, when the image shown to user's eye is a still image, the image processing is not immediately performed for the input image signal, but it is held when photo-charges are accumulated continuously for a period of time in all pixels (e.g., photodiode of image sensor) configuring a screen.

In terms of hardware, the photo-charges are accumulated through a control signal for operating the image sensor (Step 3).

Then, the amount of accumulated photo-charge (C) in the pixel is determined through a hardware component or a software (Step 4).

Then, it is determined whether the amount of photo-charge (C) is equal to or greater than a set threshold value (TV) or is less than the threshold value (TV) (Step 5). At this time, when the amount of photo-charge is less than the threshold value (TV), a control signal is adjusted so that photo-charges may be accumulated to be equal to or more than the threshold value in a pixel, and, when the amount of photo-charge is equal to or greater than the threshold value (TV), an image processing is performed for the input image signal.

As described above, the image display method according to a second embodiment of the present disclosure may display image by adjusting an image processing timing according to the accumulated charge amount in the pixel on the basis of the amount of changed image, however, alternatively, may display image according to an image processing timing signal on the basis of a preset time per one frame, without determining the accumulated charge amount in the pixels.

Figure 10:
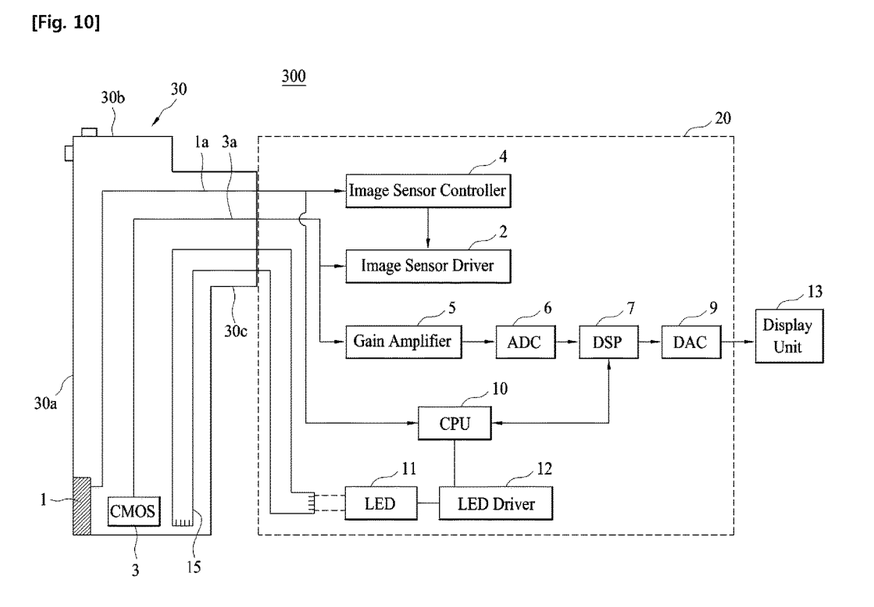
FIG. 10 is a diagram illustrating an endoscope apparatus equipped with an image display system according to an embodiment of the present disclosure.

FIG. 10 is a diagram illustrating an endoscope apparatus equipped with an image display system according to an embodiment of the present disclosure.

As shown, in the endoscope apparatus 300 according to an embodiment of the present disclosure, constituent elements similar to those shown in FIG. 1 are denoted by the same reference number, and a description thereof is omitted.

The endoscope apparatus 300 may include an electronic endoscope 30 which observes a light of visible light area emitted from an object, a video processor 20, such as an image processing apparatus, which drives the electronic endoscope and performs a signal processing for the image captured by the electronic endoscope, and a display unit 13 which displays a captured image of an object.

The electronic endoscope 30 may include an insertion part 30a which flexible or rigid and which is inserted into a body cavity which light scarcely reaches, a handling part 30b provided to an end of the insertion part 30a, and an universal cord part 30c extended from the side of the handling part 30b, and may be electrically connected to the video processor 20 via the universal cord part 30c.

In addition, a main body part of the electronic endoscope 30 may be mainly configured of the insertion part 30a and the handling part 30b, and the captured image signal and control signals may be conveyed to the video processor 20 via a cable 1a, 3a.

The image sensor 3 such as CMOS or CCD 3, the motion detection sensor 1 such as a gyro sensor or an acceleration sensor, and a forceps hole may be provided to a far end of the insertion part 30a. Since the forceps hole is widely known, a description thereof is omitted.

The image sensor 3 may be connected to an image sensor driving unit 2 via a cable 3a configure of a plurality of bundled signal wires 3a, and the motion detection sensor 1 may be also connected via a cable 1a.

A light guide 15 may be connected to the video processor 20 through the universal cord part 30c in the insertion part 30a. The light guide 15 may include an optical system (not shown), and may guide to output a light irradiated from a light source such as an LED provided from the video processor 20 to the end of insertion part.

For the video processor 20, only components related to the image pickup is illustrated, but a description of other general components necessary for driving is omitted.

The video processor 20 may include at least an image sensor driver 2, the gain amplifier 5, the analog-digital converter (ADC) 6, the digital signal processor (DSP) 7, the digital-analog converter (DAC) 9, the CPU 10, the light source LED 11, and the light source LED driver 12.

The light source 11 uses a LED but may use a lamp that can be rapidly turned on and turned off. In addition, the light source may be provided to the far end of the insertion part 30a or provided in the handling part 30b.

Meanwhile, the image sensor used in an embodiment of the present disclosure uses a single image sensor but may use at least two or more image sensors for capturing a three-dimensional image. In addition, the present embodiment may apply the image pickup system including one or more image sensors.

In addition, the image display method of the endoscope apparatus according to an embodiment of the disclosure may utilize all of the image sensor control method in the above described image display system, the timing for describing the image pickup operation, and the control signal applying method for controlling the image sensor. Therefore, the description thereof is omitted.

As described above, the image display method and the image display system according to an embodiment of the present disclosure can improve the quality of the image by differently processing the image data according to the still image or the video.

The laparoscopic apparatus according to an embodiment of the present disclosure enables an observer to clearly identify an object.

Hereinabove, although the present disclosure has been described with reference to exemplary embodiments and the accompanying drawings, the present disclosure may be not limited thereto, but may be variously modified and altered by those skilled in the art to which the present disclosure pertains without departing from the spirit and scope of the present disclosure claimed in the following claims.

What is claimed is:

1. An image display system comprising:
a motion detector which is mounted in an apparatus and which senses a movement of the apparatus;
an image sensor including a first switch, a second switch electrically connected to a side of the first switch, which performs an image pickup of an object, and converts the image into an image signal;
an image sensor controller which receives a movement signal from the motion detector and controls non-activation or activation of the image sensor by applying an electronic shutter signal to an electronic shutter of the second switch according to amount of the movement of the apparatus;
an image signal processor which performs image processing for the image signal and generates an image; and
a display unit which displays the image.

2. The image display system of claim 1, wherein the electronic shutter signal is a timing control signal for controlling the non-activation or activation of the image sensor in time to the image sensor.

3. The image display system of claim 2, wherein the image sensor controller supplies a first timing control signal to the image sensor, when the amount of the movement of the apparatus is equal to or more than a critical value, and supplies a second timing control signal which is delayed for the first timing control signal to the image sensor, when the amount of the movement of the apparatus is less than the critical value.

4. The image display system of claim 2, wherein the image sensor controller supplies a first timing control signal to the image sensor, when the amount of the movement of the apparatus is equal to or more than a critical value, and supplies the first timing control signal and a second timing control signal which is delayed for the first timing control signal to the image sensor, when the amount of the movement of the apparatus is less than the critical value.

5. The image display system of claim 4, wherein the second timing signal is supplied cyclically or randomly within a single image period.

6. The image display system of claim 1, wherein the motion detector includes at least one of a gyro sensor and an acceleration sensor.

7. An image display system comprising:
an image sensor including a first switch, a second switch electrically connected to a side of the first switch, which performs an image pickup of an object, and converts the image into an image signal;

an image signal processor which performs image processing for the image signal and generates an image;

an image sensor controller which controls non-activation or activation of the image sensor by applying an electronic shutter signal to an electronic shutter of the second switch according to amount of the movement of the image; and a display unit which displays the image.

8. The image display system of claim 7, wherein the amount of the movement of the image is amount of changed image data between frames.

9. The image display system of claim 8, wherein the amount of changed image data between frames is amount of changed image data between the image data in n frame and the image data in n+1 frame.

10. The image display system of claim 7, wherein the image sensor controller supplies a timing control signal for controlling the activation of the image sensor in time to the image sensor.

11. The image display system of claim 10, wherein the image sensor controller supplies a first timing control signal to the image sensor, when the amount of the movement of the image is equal to or more than a critical value, and supplies a second timing control signal which is delayed for the first timing control signal to the image sensor, when the amount of the movement of the image is less than the critical value.

12. The image display system of claim 10, wherein the image sensor controller supplies a first timing control signal to the image sensor, when the amount of the movement of the image is equal to or more than a critical value, and supplies the first timing control signal and a second timing control signal which is delayed for the first timing control signal to the image sensor, when the amount of the movement of the image is less than the critical value.

13. The image display system of claim 12, wherein the second timing signal is supplied cyclically or randomly within a single image period.

14. An image display system comprising:

an image sensor including a first switch, a second switch electrically connected to an one side of the first switch and a photodiode connected to an another side of the first switch, which performs an image pickup of an object on a frame-by-frame basis to accumulate photo-charges in the photodiode according to an operation of the first switch;

a frame comparator which compares a changed image data between an image data of n frame and an image data of n+1 frame; and an image sensor controller which controls the image sensor so as to adjust amount of photo-charges accumulated in the photodiode by applying an electronic shutter signal to an electronic shutter of the second switch according to amount of the changed image data based on a critical value.

15. The image display system of claim 14, wherein the image sensor controller controls the image sensor to accumulate a first photo-charges in the image sensor when the amount of the changed image data is equal to or more than the critical value, and to accumulate a second photo-charges more than the first photo-charges in the image sensor when the amount of the changed image data is less than the critical value.

16. An endoscope apparatus comprising:

an endoscope which is inserted into a body cavity;

a motion detector which is mounted in the endoscope and which senses a movement of the endoscope;

an image sensor including a first switch, a second switch electrically connected to a side of the first switch, which performs an image pickup of a target in the body cavity, and converts the image into an image signal;

an image sensor controller which receives a movement signal from the motion detector and controls non-activation or activation of the image sensor by applying an electronic shutter signal to an electronic shutter of the second switch according to amount of the movement of the endoscope;

an image signal processor which performs image processing for the image signal and generates an image; and a display unit which displays the image.

\* \* \* \* \*